May 3, 1960  O. W. SCHALM ET AL  2,935,384
MILK TESTING RECEPTACLE
Filed June 18, 1956
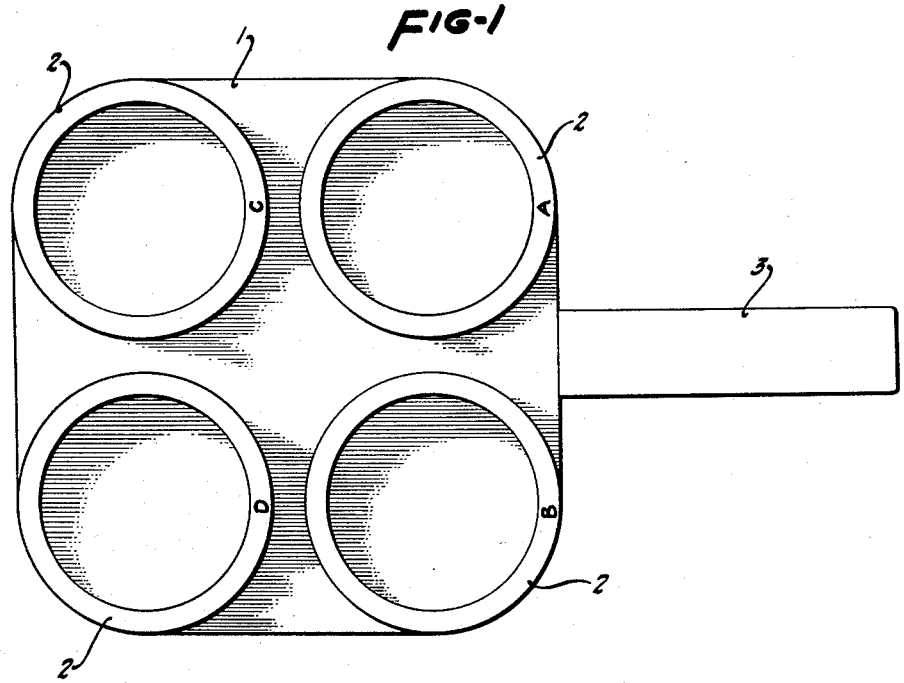
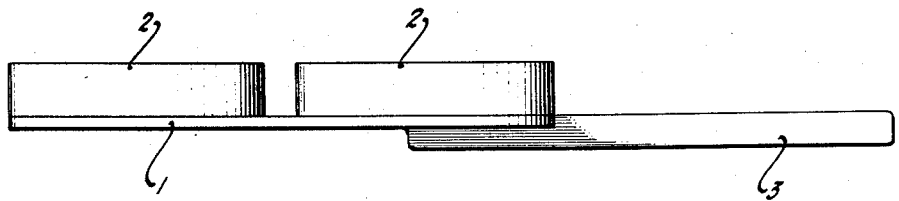
OSCAR W. SCHALM
DANIEL O. NOORLANDER
INVENTORS
BY
*Mellin and Hanson*
ATTORNEYS

United States Patent Office 2,935,384
Patented May 3, 1960

2,935,384

MILK TESTING RECEPTACLE

Oscar W. Schalm and Daniel O. Noorlander, Davis, Calif., assignors to The Regents of the University of California, Berkeley, Calif.

Application June 18, 1956, Serial No. 591,874

1 Claim. (Cl. 23—258)

This invention relates to and in general has for its object the provision of a receptacle for use in making field tests of milk for the occurrence of mastitis in cows.

Mastitis, meaning inflammation of the mammary gland, is of very common occurrence in present day commercial dairy herds. Basically, it is an infection of the gland with bacteria capable of causing disease, but injury to the udder as producer by the mechanical milker of poor design or improper use on the udder is often a predisposing and/or aggravating factor.

Dairymen in many instances are attempting to solve the mastitis problem by resorting to the injection of antibiotics into glands that have reached a point in the disease when readily visible symptoms develop. By this time, the disease has often made considerable progress within the tissues, and therapy, while partially successful, is often incapable of returning the gland to full production because of advanced tissue damage. In addition, the use of antibiotics by laymen without direction is leading to the occurrence of antibiotics in milk reaching the consumer.

Early detection of udder irritation is of prime importance in the economy of the dairy farm. A demonstration is now under way in Sacramento County, California, in which once monthly about 70 dairy herds are receiving a mastitis screening test on all lactating cows. This test is conducted in the Veterinary School of the University of California, Davis, California, on samples of milk taken from the milk bucket by the cow tester. It is recommended that cows producing milk that is positive should be tested immediately, using individual quarter samples (separate sample from each of four teats) for the purpose of ascertaining the quarter or quarters responsible for the positive reaction in the mixed milk.

Tests that are now available for use in the dairy barn at the side of the cow are not sufficiently sensitive to be really effective for early detection of mastitis. Such tests are the Strip Cup, which is a cup with a 100-mesh screen through which the milk is drawn for detection of occurrence of visible particles, and blotting papers impregnated with bromthymol blue for detection of abnormal acidity or alkalinity of milk.

To be effective as a means of detection of chronically irritated mammary glands, the Strip Cup test must be used daily. In chronic mastitis, the milk is not visibly abnormal at all times, for the milk from a given gland may be positive on strip cup examination at one milking but not the next. However, leukocyte counts on the same milks reveal no significant change for the better in the Strip Cup negative milk. A single use of the strip cup seldom detects more than 10 to 20 percent of the chronically inflamed glands.

The bromthymol blue pH indicator for detection of abnormal acidity or alkalinity, at best, does not detect more than 30 to 40 percent of the chronically inflamed glands. As pointed out above, when the inflammation has become of sufficient magnitude to alter pH or physical appearance of the milk, usually considerable damage to tissue has already occurred.

The so-called Whiteside test has been used to a considerable extent for the selection of mammary quarters that are producing milk of poor quality as a result of the existence of tissue irritation. The Whiteside method falls in the category of a screening test for the selection of milks for study by bacteriologic methods or for the removal of cows from the milking string when improvement of milk quality is demanded. There is a real need for a test that can be used at the side of the cow to detect milk having leukocyte counts exceeding the accepted normal standards. The Whiteside test is very efficient in selecting such milks but it is best used as a laboratory test. A field Whiteside test was proposed by applicants, but due to problems of handling glassware in the dairy barn and the difficulty of reading the test in dark barns, the new test was developed.

Applicants have developed a mastitis test suitable for application in the field involving the use of a new test solution, and a receptacle constituting the object of this invention and in which such tests may be carried out.

More specifically, the object of this invention is the provision of a testing receptacle including a common white translucent base or bottom provided with at least four identical, upstanding, spaced cup walls in square formation, each arranged to selectively receive milk from one of the four quarters of a cow.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claim may be embodied in other forms.

Referring to the drawings:

Fig. 1 is a top plane view of a testing receptacle embodying the objects of our invention.

Fig. 2 is a side elevation of the receptacle illustrated in Fig. 1.

The receptacle shown in these figures includes a white translucent plastic base 1 of square configuration, but wherein each of its four corners is rounded. Cemented to the top face of the bottom 1, adjacent the four corners thereof, are four identical, relatively shallow, upstanding, transparent plastic rings or cup side walls 2, said cup walls being spaced from one another. Preferably, the cups or receptacles so formed should be placed on centers approximating the centers of the four quarters or teats of a cow so that when the device is held beneath the udder of a cow, each cup of the device will be in approximate vertical registration with each of the teats in a position to receive milk therefrom.

Fastened to and extending outwardly from the base 1 is a handle 3 for holding and manipulating the test receptacle.

For identification purposes, each of the cups may be numbered or lettered as at A, B, C, D, in the order in which the teat corresponding thereto is milked.

Although the base 1 has been illustrated as a solid member, it can take the form of a frame. The essential requirements here are that each of the bases of the cups be coplanar, of a relatively light color, substantially opaque and smooth, and that all of the cups be of substantially the same size and configuration. Although for cleaning purposes it is preferable that the cups be circular, their particular configuration is otherwise immaterial.

The use of cups having translucent bottoms is desirable, for then a flashlight may be placed beneath them when making tests within a barn on dark days.

In using this device, it is held under the udder of a cow, and milk from each of the four quarters thereof is selectively milked into each of the four cups A, B, C, and D. This having been done, the attendant tilts the device to thereby permit milk to spill from each of its four cups and thus leave equal amounts of milk in said cups, regardless of the fact that unequal amounts of milk may have been milked into them. Following this, about an equal amount of the test solution is delivered to each cup and thoroughly mixed therewith by gyrating the cups. Although the test solution per se is the subject of another application, it may be noted that it is an aqueous solution of an anionic surface active agent. The presence of polymorphonuclear leukocytes and other products of inflammation in the milk is indicated by the thickening as the milk and test solution are mixed by gyrating the receptacle. A quantitative measure of the degree of mastitis occurring in the cow is based on the extent of thickening or development of viscosity of the mixture.

Since milk from each of the four quarters of the cow is tested, a determination may be readily made as to which quarter is infected.

We claim:

A receptacle for testing the milk from the four teats of a cow comprising a light colored translucent base member and four identical annular rings secured to one face of said base member and forming therewith four identical mutually spaced, shallow cups, said cups being located on centers substantially equal to the centers of the four teats of a cow; and an elongated handle formed integral with and extending outwardly from said base member.

References Cited in the file of this patent

UNITED STATES PATENTS

| | | |
|---|---|---|
| 470,870 | Lange | Mar. 15, 1892 |
| 539,264 | Hall | May 14, 1895 |
| 1,688,888 | Spreen | Oct. 23, 1928 |
| 1,705,236 | Buckley | Mar. 12, 1929 |
| 1,962,556 | Eberhardt | June 12, 1934 |
| 2,533,997 | Cochrane | Dec. 12, 1950 |
| 2,613,537 | Di Addario | Oct. 14, 1952 |